United States Patent
Nagai et al.

(10) Patent No.: US 9,384,610 B2
(45) Date of Patent: Jul. 5, 2016

(54) ON-BOARD APPARATUS CONTROL SYSTEM

(71) Applicant: DENSO CORPORATION, Kariya, Aichi-pref. (JP)

(72) Inventors: Nobuyoshi Nagai, Kariya (JP); Masahito Kojima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/416,828

(22) PCT Filed: Jul. 18, 2013

(86) PCT No.: PCT/JP2013/004393
§ 371 (c)(1),
(2) Date: Jan. 23, 2015

(87) PCT Pub. No.: WO2014/017056
PCT Pub. Date: Jan. 30, 2014

(65) Prior Publication Data
US 2015/0279138 A1    Oct. 1, 2015

(30) Foreign Application Priority Data

Jul. 24, 2012  (JP) ................................. 2012-163918

(51) Int. Cl.
*G01V 8/10* (2006.01)
*G07C 9/00* (2006.01)
*B60R 25/24* (2013.01)

(52) U.S. Cl.
CPC ............ *G07C 9/00182* (2013.01); *B60R 25/24* (2013.01); *G07C 9/00309* (2013.01); *G07C 9/00896* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 6,552,649 B1 * | 4/2003 | Okada | B60R 25/2036 307/10.1 |
| 2005/0073390 A1 | 4/2005 | Inoguchi | |

(Continued)

FOREIGN PATENT DOCUMENTS

| | | |
|---|---|---|
| EP | 2251838 A2 | 11/2010 |
| JP | 2000073635 A | 3/2000 |
| JP | 2005068715 A | 3/2005 |

(Continued)

OTHER PUBLICATIONS

International Search Report and Written Opinion (in Japanese with English Translation) for PCT/JP2013/004393, mailed Oct. 1, 2013; ISA/JP.

*Primary Examiner* — Jennifer Mehmood
*Assistant Examiner* — Pameshanand Mahase
(74) *Attorney, Agent, or Firm* — Harness, Dickey & Pierce, P.L.C.

(57) ABSTRACT

An on-board apparatus control system comprising a portable device and a vehicle-mounted device is provided. The vehicle-mounted device controls an on-board apparatus by determining whether or not the portable device exists in an authorized area. The vehicle-mounted device causes separate transmission antennas to transmit a request signal and a determination signal, respectively. Responding to the request signal, the portable device transmits a response signal that includes information on a received strength of the determination signal. When the received signal strength of the determination signal is greater than a specified value, the vehicle-mounted device controls the on-board apparatus on assumption that the portable device exists in an unauthorized area even when the response signal is received.

4 Claims, 6 Drawing Sheets

(56) References Cited

U.S. PATENT DOCUMENTS

| | | | |
|---|---|---|---|
| 2007/0200672 A1* | 8/2007 | McBride | B60R 25/245 340/5.72 |
| 2010/0075656 A1* | 3/2010 | Howarter | B60R 25/2009 455/420 |
| 2010/0144275 A1* | 6/2010 | Satou | H04W 12/06 455/41.2 |
| 2012/0244877 A1* | 9/2012 | Margalef | G01S 5/0252 455/456.1 |
| 2014/0077929 A1* | 3/2014 | Dumas | G07C 9/00571 340/5.61 |

FOREIGN PATENT DOCUMENTS

JP            2010264837 A            11/2010

* cited by examiner

ON-BOARD APPARATUS CONTROL SYSTEM

CROSS-REFERENCES TO RELATED APPLICATIONS

This application is a U.S. National Phase Application under 35 U.S.C. 371 of International Application No. PCT/JP2013/004393 filed on Jul. 18, 2013 and published in Japanese as WO 2014/017056 A1 on Jan. 30, 2014. This application is based on and claims the benefit of priority from Japanese Patent Application No. 2012-163918, filed on Jul. 24, 2012. The entire disclosures of all of the above applications are incorporated herein by reference.

TECHNICAL FIELD

The present disclosure relates to an on-board apparatus control system including a portable device carried by a user and a vehicle-mounted device that carries out control of an on-board apparatus by carrying out communication with the portable device.

BACKGROUND ART

A smart entry system has been put to practical use. In the smart entry system, when a user is carrying an authorized portable device, the system stops or starts an engine in response to push of an engine switch, and locks or unlock a vehicle door in response to touch of a vehicle door switch through performing cross-checking between the portable device carried by the user and the vehicle-mounted device mounted in a vehicle (for example, refer to Patent Literature 1).

PRIOR ART LITERATURES

Patent Literature

Patent Literature 1: JP-A-2000-73635 (corresponding to U.S. Pat. No. 6,552,649)

SUMMARY OF INVENTION

In this kind of smart entry system, transmitting antennas provided in a plurality of places in a vehicle, such as, for example, on the vehicle's driver's seat side, passenger seat side, and trunk outer side, are connected to a vehicle-mounted device via wiring harnesses. Because of this, it may happen that the wiring harness between the vehicle-mounted device and a certain transmitting antenna picks up radio waves leaking from the wiring harness between the vehicle-mounted device and another transmitting antenna. In this case, when radio waves for cross-checking are transmitted from a certain transmitting antenna of the vehicle, the radio waves may leak from another transmitting antenna of the vehicle. According to studies by the inventors, the following phenomenon may occur when the radio wave leak exists.

For example, as shown by the related art of FIG. 7, when a person (non-portable device possessor) 30 not possessing a portable device 20 operates a left side switch 40L, an ID request signal is transmitted into a region indicated by reference sign Ra from a transmitting antenna 41L on the left side of the vehicle. By rights, a door 42L of the vehicle should not unlock even when the non-portable device possessor 30 carries out an operation of the switch 40L. But when the portable device 20 of a portable device possessor 31 exists in a leak region Ra', as shown in FIG. 7, the portable device 20 of the portable device possessor 31 receives the ID request signal, and returns portable device ID. Because of this, there is concern that a situation unfavorable in terms of the security of the vehicle will occur in that the door 42L on the left side of the vehicle will be unlocked, regardless of the fact that the non-portable device possessor 30 has carried out the operation of the switch 40L.

The following kind of technology can be considered as technology for avoiding this kind of situation. For example, when a right side switch 40R is operated, an ID request signal is transmitted from the transmitting antenna 41L, and radio waves of the same intensity are transmitted separately from the ID request signal from each of transmitting antennas 41L and 41R, the portable device 20, on receiving the ID request signal, returns portable device ID and measures the electrical field intensity of each of the two radio waves, and returns measurement data on the two electrical field intensities. Then, it can be considered that it is determined on the vehicle side that the portable device 20 exists (that is, the portable device possessor 31 exists) on the side of the radio wave whose electrical field intensity is measured as the stronger of the two radio waves and, when the side determined is, for example, the right side of the vehicle, determined that the portable device possessor him or herself has operated the switch 41R, cross-checking of the portable device ID and vehicle ID is carried out, and in the event of a match, a door 42R on the right side of the vehicle 20 is unlocked.

In this case, however, it is necessary for radio waves of the same intensity to be transmitted at differing timings from each of the transmitting antennas 41L and 41R, separately from the ID request signal, and the portable device 20 needs to measure the electrical field intensity of each of the radio waves transmitted from the transmitting antennas 41L and 41R and return measurement data on the two electrical field intensities, because of which the response time increases.

In view of the foregoing, it is an object of the present disclosure to, while reducing response time, prevent a portable device from being erroneously detected as existing in an authorized area despite existing in an unauthorized area.

In order to achieve the object of the present disclosure, an on-board apparatus control system comprises a portable device and a vehicle-mounted device. The portable device is carried by a user. The vehicle-mounted device, by communication with the portable device, make a determination of whether or not the portable device exists in an authorized area, and carries out control of an on-board apparatus in accordance with a result of the determination. The vehicle-mounted device includes a request signal sender and a determination signal sender. The request signal sender causes a specific transmission antenna mounted on a vehicle to transmit a request signal to the portable device existing in the authorized area around the vehicle. The determination signal sender causes another transmission antenna, which is separate from the specific transmission antenna transmitting the request signal, to transmit a determination signal to the portable device existing in an unauthorized area around the vehicle. The portable device includes a received signal strength measurement unit, a received signal strength measurement unit and a response signal sender. The received signal strength measurement unit measures a received signal strength of the determination signal. When receiving the request signal, the response signal sender generates a response signal responding to the request signal so as to include received signal strength information representing the received signal strength of the determination signal, and transmits the response signal to the vehicle-mounted device. The vehicle-mounted device includes a reception determination unit, a received strength determination unit and an on-board apparatus control unit. The reception determination unit determines whether or not the response signal has been received. The received strength determination unit determines, based on the received signal strength information included in the response signal, whether or not the received signal strength of the determination signal is greater than a specified value. When the reception strength determination unit determines that the received signal strength of the determination signal is greater than the specified value, the on-board apparatus control unit carries out the control of the on-board apparatus on assumption that the portable device exists in the unauthorized area, even when the reception determination unit determines that the response signal has been received.

According to this kind of configuration, an vehicle-mounted device transmits a request signal to a portable device existing in an authorized area around the vehicle from a specific transmitting antenna mounted on the vehicle, and transmits a determination signal to a portable device existing in an unauthorized area around the vehicle from another transmitting antenna, which is separate from the specific transmitting antenna for transmitting the request signal. The portable device measures the received signal strength of the determination signal and. When receiving the request signal, the portable device generates a response signal responding to the request signal so as to include received signal strength information representing the received signal strength of the determination signal, and transmits the response signal to the vehicle-mounted device. The vehicle-mounted device determines whether or not the response signal has been received, determines whether or not the received signal strength of the determination signal is greater than a specified value based on the received signal strength information included in the response signal. Even when it is determined that the response signal has been received, the vehicle-mounted device carries out control of on-board apparatus on assumption that the portable device exists in an unauthorized area when it is determined that the received signal strength of the determination signal is greater than the specified value. Therefore, the portable device can be prevented from being erroneously detected as existing in an authorized area despite existing in an unauthorized area, while reducing response time. The authorized area refers to, for example, a predetermined region on a periphery of one door on which the touch operation is carried out, when a sensor for detecting a door touch operation for unlocking a vehicle door detects a touch operation of the one door among the plurality of vehicle doors. The unauthorized area may refer to, for example, a predetermined region on peripheries of the plurality of doors other than the one door on which the touch operation is carried out. Also, the specific transmitting antenna may refer to, for example, an antenna corresponding to the one door on which the touch operation is carried out, for example, a transmitting antenna positioned in the vicinity of the one door on which the touch operation is carried out. The another transmitting antenna, which is separate from the specific transmitting antenna, may refer to, for example, an antenna corresponding to a door other than the one door on which the touch operation is carried out, for example, an antenna positioned in the vicinity of a door other than the door on which the touch operation is carried out.

BRIEF DESCRIPTION OF DRAWINGS

The above and other objects, features, and advantages of the present disclosure will become more apparent from the below description made with reference to the accompanying drawings. In the attached drawings.

EMBODIMENTS FOR CARRYING OUT INVENTION

First Embodiment

Figure 1:
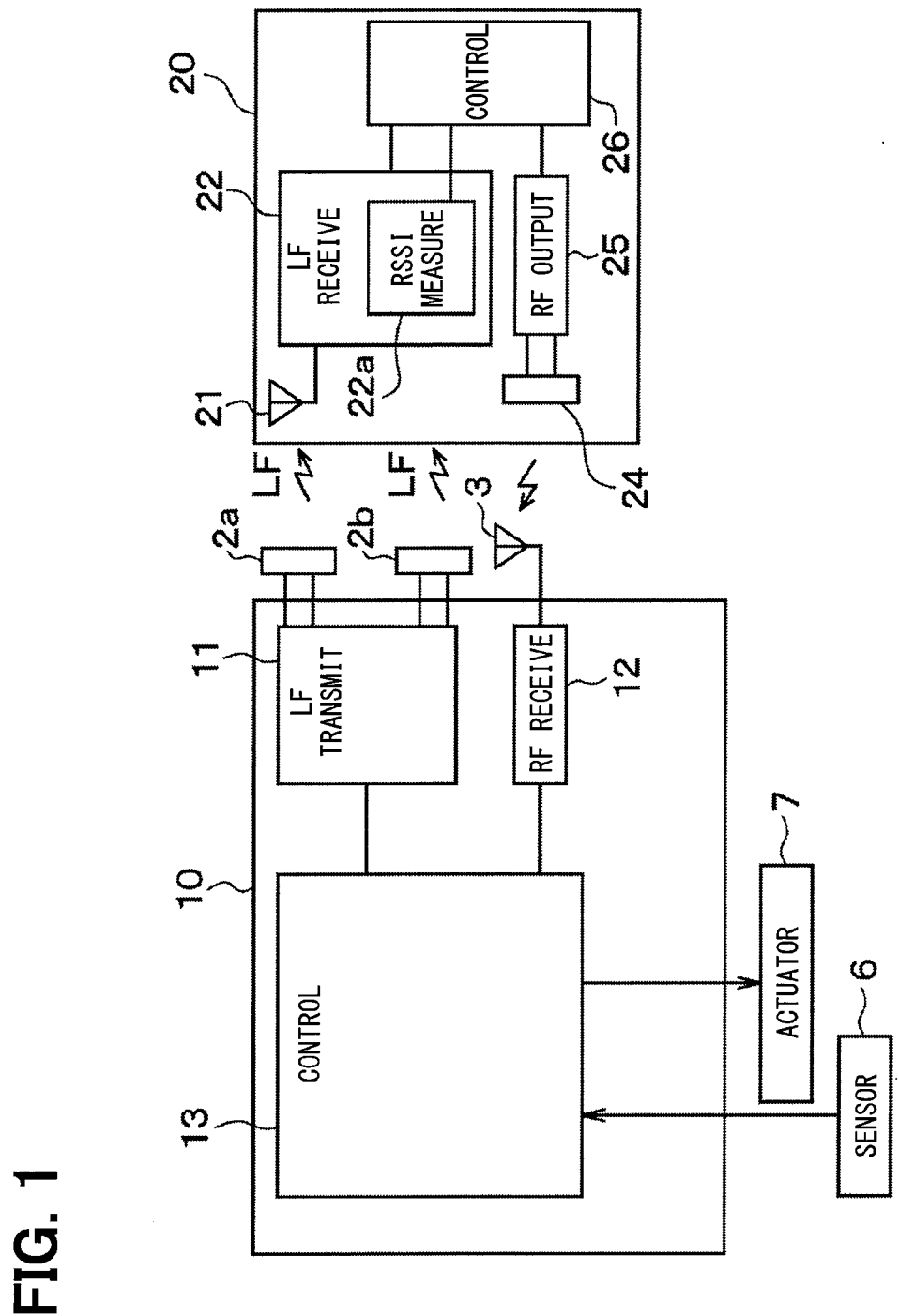
FIG. 1 is a diagram showing the configuration of an on-board apparatus control system according to one embodiment of the present disclosure.

A configuration of an on-board apparatus control system according to a first embodiment of the present disclosure is shown in FIG. 1. The on-board apparatus control system includes a portable device 20 carried by a user, and a vehicle-mounted device 10. The vehicle-mounted device 10 determines by communication with the portable device 20 whether or not the portable device 20 exists in an authorized area, and carries out control of an on-board apparatus in accordance with the result of the determination. The on-board apparatus control system carries out unlocking of a vehicle door and starting of a vehicle drive device (for example, an engine).

In the system, an LF (low frequency) waveband request signal is transmitted from the vehicle-mounted device 10 to the portable device 20, and an RF (radio frequency) waveband response signal is transmitted from the portable device 20 to the vehicle-mounted device 10.

Now, description will be given of LF band communication distance. In the case of communication in an RF band, wavelength is short. Thus, communication is carried out in a radiation field region even in the case of short distance communication. However, in the case of the short distance LF band wireless communication in a smart system, wavelength is extremely long in comparison with the communication distance, and communication is carried out in an induction field region. Distance attenuation in an RF band is such that attenuation occurs in inverse proportion to the square of the distance, but distance attenuation in an LF band is such that attenuation occurs in inverse proportion to the cube of the distance. Because of this, communication in an LF band is such that communication limited to a specific area is possible.

The vehicle-mounted device 10 includes an LF transmitter 11, an RF receiver 12, and a controller 13. The LF transmitter 11 is connected to an LF transmitting antenna 2a provided in a center pillar on the driver's seat side or the like and an LF transmitting antenna 2b provided in a center pillar on the passenger seat side or the like. The RF receiver 12 is connected to an RF receiving antenna 3. Also, a sensor 6 and an actuator 7 are connected to the controller 13.

The LF transmitting antennas 2a and 2b are antennas for carrying out wireless transmission of LF waveband signals (LF radio waves). The LF transmitter 11 modulates LF data signals output from the controller 13 into LF waveband signals, and outputs the LF waveband signals to the LF transmitting antennas 2a and 2b.

The RF receiving antenna 3 is an antenna for carrying out wireless reception of RF waveband signals (RF radio waves). The RF receiver 12 demodulates RF waveband signals received by the RF receiving antenna 3, and outputs the demodulated RF waveband signals as RF data signals to the controller 13.

The sensor 6 is attached to a door handle portion, or the like, of a vehicle door, for detecting an operation of the user placing a hand on the door and outputting the result of the detection to the controller 13. The sensor 6 may be provided as, for example, a touch sensor.

The actuator 7 is subject to a smart drive, and includes a vehicle engine starter motor (or an engine ECU that controls a starter motor), a door locking mechanism that locks and unlocks a vehicle door (an ECU that controls a door locking mechanism), or the like.

The controller 13 carries out a smart drive based on communication with the portable device 20 by exchanging signals with the LF transmitter 11, RF receiver 12, sensor 6, and actuator 7.

The vehicle side controller 13 is provided as a microcomputer including a CPU (central processing unit), RAM (random access memory), ROM (read only memory), I/O (input/output), and the like, and implements various processes by executing by the CPU a program stored in the ROM and using the RAM as a working area. Processes executed by the CPU are processes of the vehicle side controller 13.

The portable device 20 includes an LF receiving antenna 21, an LF reception unit 22, an RF transmitting antenna 24, an RF output unit 25, and a portable side controller 26.

The LF receiving antenna 21 is an antenna for receiving LF radio wave signals transmitted from the vehicle-mounted device 10. The LF reception unit 22 includes a circuit that demodulates LF waveband signals received by the LF receiving antenna 21, and outputs the demodulated LF waveband signals as LF data signals to the portable side controller 26.

The LF reception unit 22 includes an RSSI measurement unit 22a that measures the received signal strength of the LF waveband signals received by the LF receiving antenna 21. When a determination signal transmitted from the vehicle-mounted device 10 separately from the request signal is received by the LF receiving antenna 21, the RSSI (received signal strength) measurement unit 22a measures the received signal strength of the determination signal, and outputs RSSI received data representing the received signal strength to the portable side controller 26.

The RF transmitting antenna 24 is an antenna for carrying out wireless transmission of RF waveband signals (RF radio waves). The RF output unit 25 includes a circuit that modulates RF data signals output from the portable side controller 26 into RF waveband signals, and outputs the RF waveband signals to the RF transmitting antenna 24.

The portable side controller 26 is provided as a microcomputer including a CPU, RAM, ROM, I/O, and the like, and implements various processes by using the RAM as a working area and by executing by the CPU a program stored in the ROM. Hereafter, processes executed by the CPU will be described as processes of the portable side controller 26.

In the on-board apparatus control system, a request signal (ID request signal) is transmitted from the vehicle-mounted device 10 to an authorized area, a determination signal (burst signal) is transmitted separately from the request signal from an unauthorized area, a response signal responding to the request signal is transmitted from the portable device 20 so as to include RSSI received data representing the received signal strength of the determination signal. When the received signal strength of the burst signal specified by the RSSI received data is equal to or greater than a reference value, the vehicle-mounted device 10 carries out a control of the on-board apparatus on assumption that the portable device 20 exists in a radio wave leak area.

Figure 2:
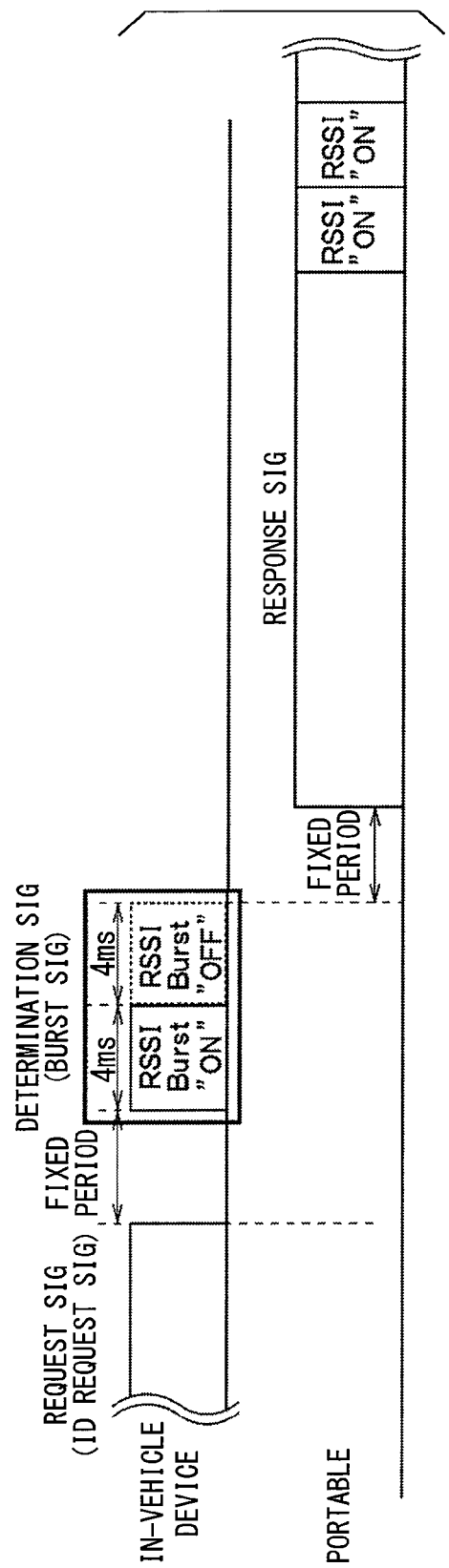
FIG. 2 is a diagram showing a communication format between a vehicle-mounted device and a portable device.

FIG. 2 shows a communication format between the vehicle-mounted device 10 and the portable device 20. The request signal is a signal transmitted to an authorized area from the vehicle-mounted device 10, while the burst signal is a signal transmitted to an unauthorized area from the vehicle-mounted device 10. Also, the response signal is a signal transmitted from the portable device 20 in response to receiving a request signal.

The burst signal is provided with an RSSI burst "ON" and an RSSI burst "OFF". An RSSI burst "ON" period is such a period that the burst signal is continuously at a high level for a fixed period, while an RSSI burst "OFF" period is such a period that the burst signal is continuously at a low level for a fixed period.

RSSI "ON" and RSSI "OFF" are included in the response signal. Received signal strength information representing received signal strength measured by the RSSI measurement unit 22a in the RSSI burst "ON" period of the burst signal is set in RSSI "ON", while received signal strength information representing received signal strength measured by the RSSI measurement unit 22a in the RSSI burst "OFF" period of the burst signal is set in RSSI "OFF".

The burst signal is regulated so that transmission is started a fixed period after the tail end of the request signal. Also, the response signal is regulated so that transmission is started a fixed period after the tail end of the burst signal.

Figure 3:
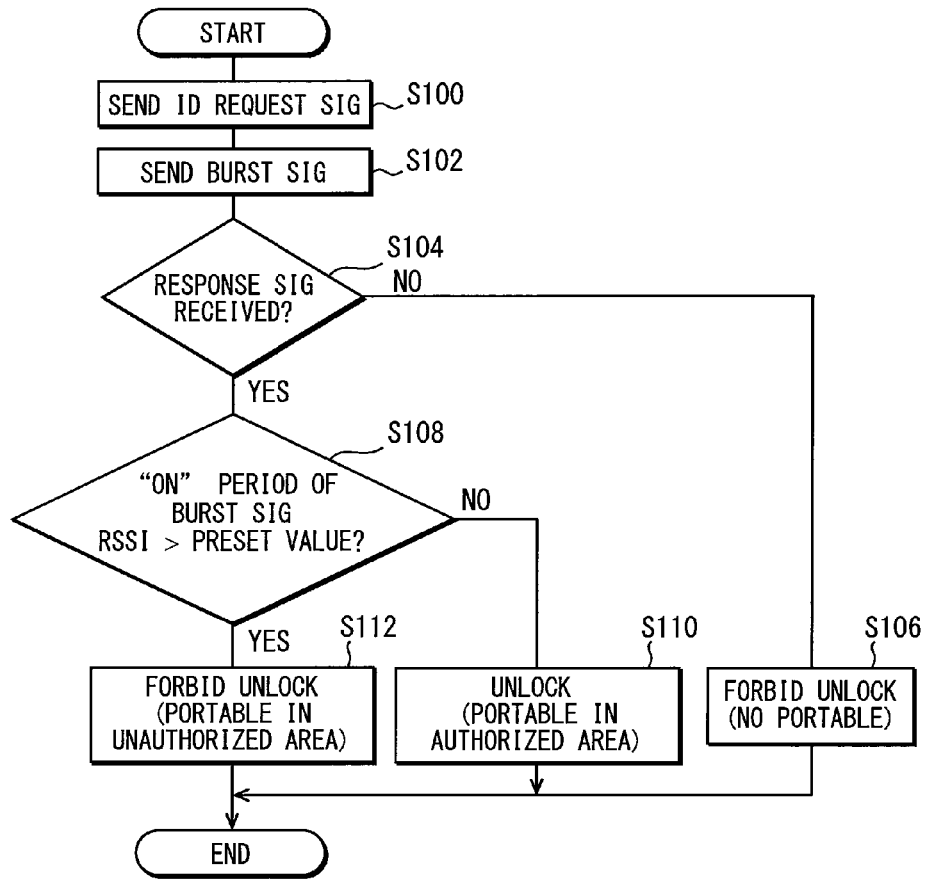
FIG. 3 is a flow chart of a vehicle side controller of the on-board apparatus control system according to the first embodiment.
Figure 5:
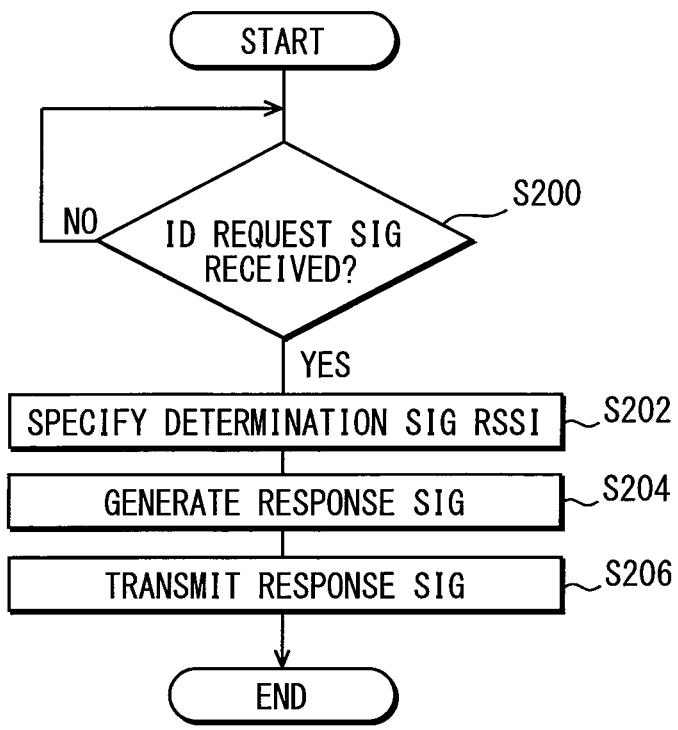
FIG. 5 is a flow chart of a portable device side controller of the on-board apparatus control system according to the first embodiment.

FIG. 3 shows a flow chart of the vehicle side controller 13 of the on-board apparatus control system when the user carries out a touch operation of the sensor 6 in order to carry out unlocking of a vehicle door. Also, FIG. 5 shows a flow chart of the portable device side controller 26. The portable device side controller 26 cyclically implements the process shown in FIG. 5. Also, when a touch operation by the user is detected by the sensor 6, the vehicle side controller 13 implements the process shown in FIG. 3. Herein, a description will be given with a case wherein a touch operation by the user is detected by the sensor 6 provided on the passenger seat side of the vehicle as an example.

Firstly, a request signal (ID request signal) is transmitted from the specific transmitting antenna 2b mounted on the vehicle to a portable device existing in an authorized area on the periphery of the vehicle (S100). In this case, as shown in a left side portion of FIG. 4, the passenger seat side of the vehicle is the authorized area, and the request signal (ID request signal) is transmitted from the transmitting antenna 2b (marked as a transmitting antenna B in the drawing) mounted on the vehicle to a portable device existing in the authorized area. At this time, when the wire harness between the vehicle-mounted device 10 and a transmitting antenna A provided on the driver's seat side of the vehicle picks up radio waves leaking from the wire harness between the vehicle-mounted device 10 and the transmitting antenna 2b (marked as the transmitting antenna B in the drawing) provided on the passenger seat side of the vehicle, the leaked radio waves are transmitted from the transmitting antenna A provided on the driver's seat side of the vehicle, as shown in the left side portion of FIG. 4.

Figure 4:
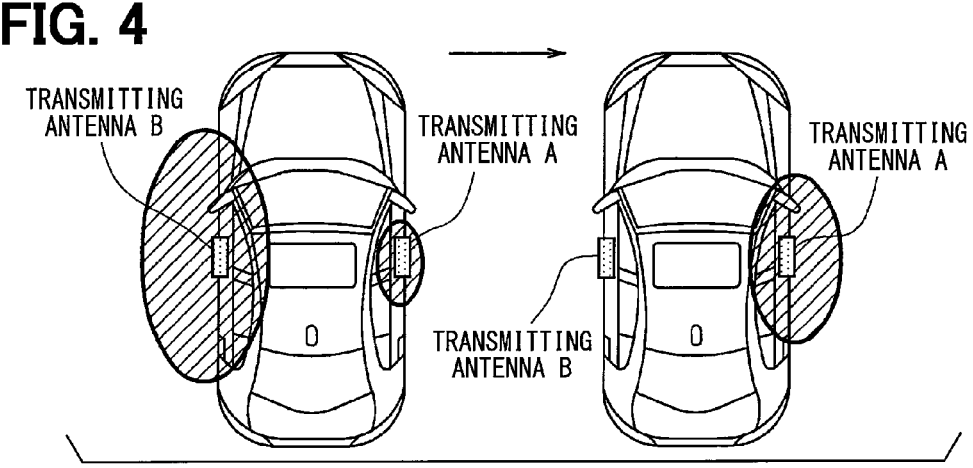
FIG. 4 is a diagram for illustrating an authorized area and an unauthorized area.

Next, as shown in the left side portion of FIG. 4, the determination signal (burst signal) shown in FIG. 2 is transmitted to a portable device existing in an unauthorized area on the periphery of the vehicle from the transmitting antenna 2a (transmitting antenna A) separate from the transmitting antenna 2b (transmitting antenna B) that has transmitted the request signal (S102).

Meanwhile, as shown in FIG. 5, the portable device side controller 26 determines whether or not the determination signal has been received (S200). In this case, when the determination signal has not been received, the determination of S200 is "NO", and the determination of S200 is repeated. When the determination signal has been received, the determination of S200 is "YES". Then, the RSSI of the determination signal is specified (S202). Specifically, the RSSI of the determination signal can be specified by the received signal strength in the determination signal RSSI burst "ON" period being measured by the RSSI measurement unit 22a.

Next, a response signal is generated (S204). Specifically, a response signal responding to the request signal is generated so as to include received signal strength information representing the received signal strength of the determination signal.

Next, the generated response signal is transmitted to the vehicle-mounted device 10 (S206), and then, the process is ended.

Returning to the description of FIG. 3, the vehicle-mounted device 10 determines whether or not the response signal has been received (S104). In this case, when the response signal has not been received, the determination of S104 is "NO", and unlocking of the vehicle door is forbidden on assumption that the portable device 20 is not in the authorized area (S106).

When the response signal has been received, the determination of S104 is "YES". And then, based on the RSSI "ON" included in the response signal, it is determined whether or not the received signal strength measured by the portable device 20 in the burst signal RSSI burst "ON" period is greater than a predetermined specified value (S108).

For example, When the portable device 20 exists in an authorized area such as the communication area of the transmitting antenna B shown in the left side portion of FIG. 4 and the received signal strength measured by the portable device 20 in the burst signal RSSI burst "ON" period is equal to or smaller than the predetermined specified value, the determination of S108 is "NO", and unlocking of the vehicle door is implemented on assumption that the portable device 20 is in the authorized area (S110).

For example, when the portable device 20 exists in an unauthorized area such as the communication area of the transmitting antenna A shown in the left side portion of FIG. 4, and the received signal strength measured by the portable device 20 in the burst signal RSSI burst "ON" period is greater than the predetermined specified value, the determination of S108 is "YES", and unlocking of the vehicle door is forbidden on assumption that the portable device 20 is in an unauthorized area (S112). That is, even when a response signal responding to a request signal is transmitted from the portable device 20 existing in an unauthorized area because of leaked radio waves, unlocking of the vehicle door is forbidden on assumption that the portable device 20 is in an unauthorized area when it is determined, based on the RSSI "ON" of the received signal strength information included in the response signal, that the received signal strength measured by the portable device 20 in the burst signal RSSI burst "ON" period is greater than the predetermined specified value.

According to the heretofore described configuration, an vehicle-mounted device transmits a request signal to a portable device existing in an authorized area on the periphery of the vehicle from a specific transmitting antenna mounted on the vehicle, and transmits a determination signal to a portable device existing in an unauthorized area on the periphery of the vehicle from a transmitting antenna separate from the specific transmitting antenna that has transmitted the request signal, wherein the portable device measures the received signal strength of the determination signal and, when receiving the request signal, generates a response signal responding to the request signal so as to include received signal strength information representing the received signal strength of the determination signal, and transmits the response signal to the vehicle-mounted device. The vehicle-mounted device determines whether or not the response signal has been received, determines whether or not the received signal strength of the determination signal is greater than a specified value based on the received signal strength information included in the response signal. When it is determined that the received signal strength of the determination signal is greater than the specified value, the vehicle-mounted device carries out control of on-board apparatus on assumption that the portable device exists in an unauthorized area even when it is determined that the response signal has been received. Therefore, the portable device can be prevented from being erroneously detected as existing in an authorized area despite existing in an unauthorized area, while reducing response time.

Furthermore, when it is determined that the response signal has been received and determined that the received signal strength of the determination signal is equal to or smaller than the specified value, the control of the on-board apparatus is carried out on assumption that the portable device exists in the authorized area. Therefore, the control of the on-board apparatus can be carried out more accurately.

Furthermore, the vehicle-mounted device transmits the determination signal after the elapse of a predetermined period from the request signal being transmitted. Therefore, the portable device can ascertain the leading edge position of the determination signal in accordance with the period from the request signal being transmitted, whereby further reduction of the response time can be achieved.

Furthermore, a determination signal has a high level period where a high level continues for a fixed period, and a low level period where a low level continues for a fixed period. Therefore, the portable device can measure each of the received signal strength in the high level period and the received signal strength in the low level period. An authorized area may refer to, for example, a predetermined region that, when a sensor that detects a door touch operation for unlocking a vehicle door detects a touch operation of one door among the plurality of vehicle doors, is on the periphery of the door on which the touch operation is carried out.

The authorized area refers to, for example, a predetermined region on a periphery of one door on which the touch operation is carried out, when a sensor for detecting a door touch operation for unlocking a vehicle door detects a touch operation of the one door among the plurality of vehicle doors. The unauthorized area may refer to, for example, a predetermined region on peripheries of the plurality of doors other than the one door on which the touch operation is carried out. Also, the specific transmitting antenna may refer to, for example, an antenna corresponding to the one door on which the touch operation is carried out, for example, a transmitting antenna positioned in the vicinity of the one door on which the touch operation is carried out. The another transmitting antenna, which is separate from the specific transmitting antenna, may refer to, for example, an antenna corresponding to a door other than the one door on which the touch operation is carried out, for example, an antenna positioned in the vicinity of a door other than the door on which the touch operation is carried out.

Second Embodiment

Figure 6:
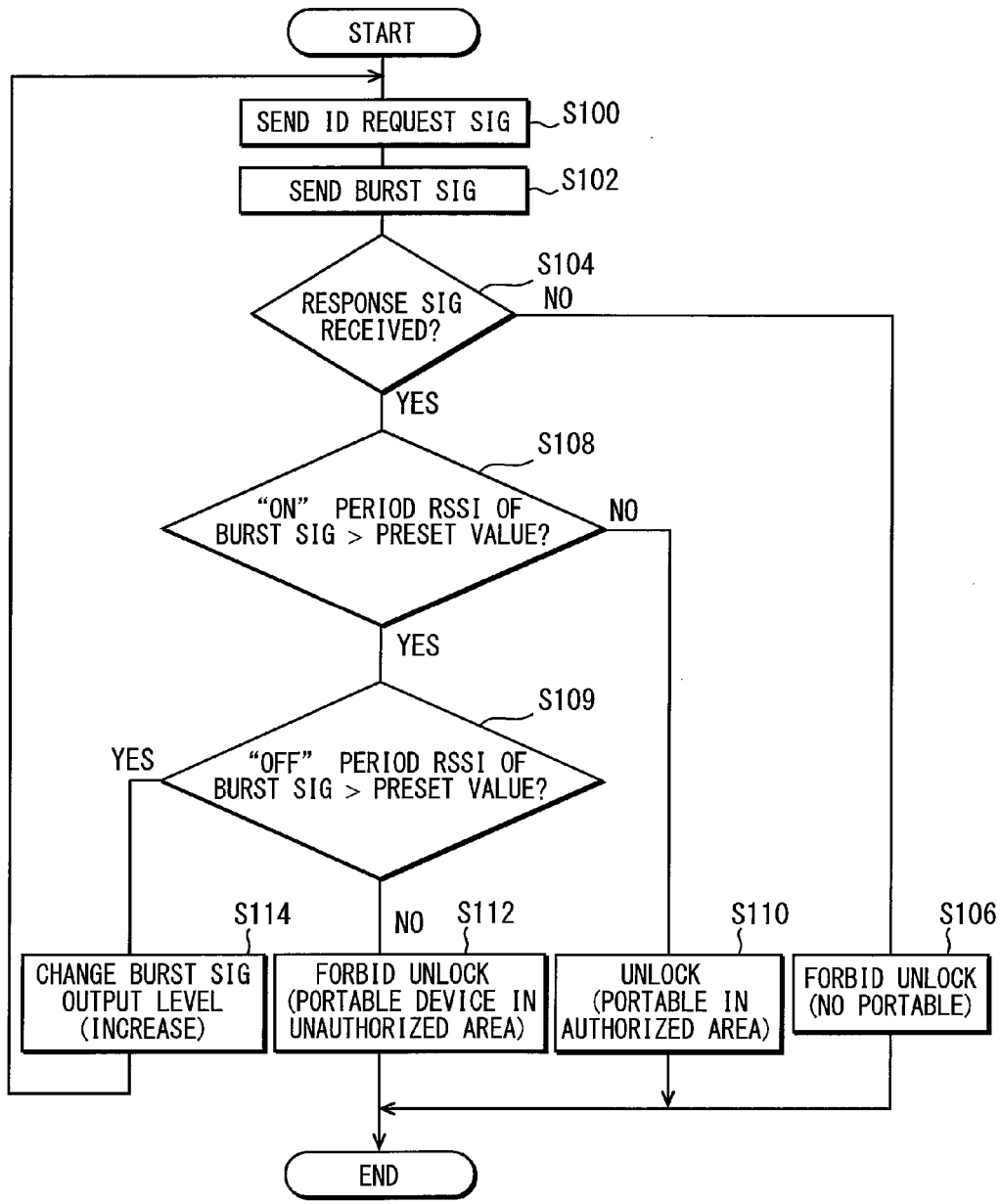
FIG. 6 is a flowchart of a vehicle side controller of an on-board apparatus control system according to a second embodiment.
Figure 7:
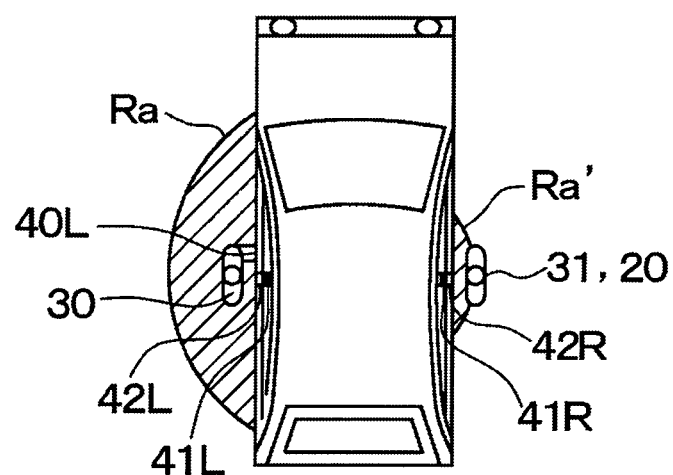
FIG. 7 is a diagram illustrating the related art.

An on-board apparatus control system according to a second embodiment of the present disclosure can be the same configuration as that shown in FIG. 1. A flowchart of the vehicle side controller according to this embodiment is shown in FIG. 6. The on-board apparatus control system according to this embodiment differs from the flowchart of the vehicle side controller according to the first embodiment shown in FIG. 3 in that steps S109 and S114 are added. The process of a vehicle side controller 13 is different. The same references are used to refer to the same parts as in the first embodiment, and explanation on these may be omitted. In the following, a description will be given centered on the differing points.

As shown in FIG. 6, the vehicle side controller 13, based on the RSSI "ON" included in the response signal, determines in S108 whether or not the received signal strength measured by a portable device 20 in the burst signal RSSI burst "ON" period is greater than a predetermined specified value.

Then, if the received signal strength is greater than the predetermined specified value, the determination of S108 is "YES". Then, based on the RSSI "OFF" included in the response signal, it is determined whether or not the received signal strength measured by the portable device 20 in the burst signal RSSI burst "OFF" period is greater than a predetermined specified value (S109). That is, it is determined based on the RSSI "OFF" included in the response signal whether or not the noise level on the periphery of the vehicle is greater than a specified value.

For example, when the noise level on the periphery of the vehicle is high, and the noise level on the periphery of the vehicle is greater than the specified value, the determination of S109 is "YES", the burst signal output level is changed so as to increase (S114), and the process returns to S100. Because of this, the determination signal (burst signal) is output at a higher output level in S104 on the next occasion.

When the noise level on the periphery of the vehicle is equal to or smaller than the specified value, the determination of S109 is "NO", and unlocking of the vehicle door is forbidden on assumption that the portable device 20 is in an unauthorized area (S112). That is, even when a response signal responding to a request signal is transmitted from the portable device 20 existing in an unauthorized area because of leaked radio waves, unlocking of the vehicle door is forbidden on assumption that the portable device 20 is in an unauthorized area if it is determined, based on the RSSI "ON" of the received signal strength information included in the response signal, that the received signal strength measured by the portable device 20 in the burst signal RSSI burst "ON" period is greater than the predetermined specified value, and determined, based on the RSSI "OFF" of the received signal strength information included in the response signal, that the received signal strength measured by the portable device 20 in the burst signal RSSI burst "OFF" period is equal to or smaller than the predetermined specified value.

According to the heretofore described configuration, a portable device measures the received signal strength in a high level period and low level period of a determination signal separately, and generates a response signal responding to a request signal so as to include received signal strength information representing the received signal strength in the high level period of the determination signal and received signal strength information representing the received signal strength in the low level period of the determination signal. The vehicle-mounted device determines whether or not the noise level on the periphery of the vehicle is greater than a specified value based on the received signal strength information representing the received signal strength in the low level period of the determination signal. The vehicle-mounted device increases the transmission level when it is determined that the noise level on the periphery of the vehicle is greater than a specified value, and commands so that a determination signal is transmitted to a portable device existing in an unauthorized area on the periphery of the vehicle. Therefore, it can be accurately determined whether or not a portable device exists in an unauthorized area, even when the noise level on the periphery of the vehicle is high. Also, it can be supposed that when radio waves of a high transmission level are transmitted to the periphery of the vehicle, the radio waves constitute interference for peripheral vehicles. However, according to the heretofore described configuration, the transmission level is increased when it is determined based on the received signal strength information representing the received signal strength in the low level period of the determination signal that the noise level on the periphery of the vehicle is greater than the specified value, and a determination signal can be transmitted to a portable device existing in an unauthorized area on the periphery of the vehicle. Therefore, the transmission level of the initial determination signal can be suppressed, and the effect on peripheral vehicles due to the transmission of the determination signal can thus be suppressed.

Other Embodiments

The first and second embodiments illustrate an example in which request signals are output from the LF transmitting antenna 2a in the center pillar on the driver's seat side, or the like, and the LF transmitting antenna 2b in the center pillar on the passenger seat side, or the like. However, this does not limit the configuration. For example, LF transmitting antennas may be outside the trunk, at the front of the vehicle on the driver's seat side, at the rear of the vehicle on the driver's seat side, at the front of the vehicle on the passenger seat side, at the rear of the vehicle on the passenger seat side, and the like. In this case, it may be sufficient to configure so that, after a request signal is transmitted to a portable device existing in an authorized area on the periphery of the vehicle from a specific transmission antenna mounted on the vehicle, determination signals are transmitted sequentially from the transmission antennas other than the specific transmission antenna that has transmitted the request signal to a portable device existing in an unauthorized area on the periphery of the vehicle, the portable device measures the received signal strengths of the sequentially transmitted determination signals, generates a response signal responding to the request signal so as to include received signal strength information representing the received signal strengths of the determination signals, and transmits the response signal to the vehicle-mounted device.

In the first and second embodiments, the determination signal is transmitted after the elapse of a predetermined period from the request signal being transmitted. However, the timing at which the determination signal is transmitted is not limited to this timing.

In the above embodiments, the vehicle-mounted device compares the received signal strength measured by the RSSI measurement unit 22a in the burst signal RSSI burst "ON" period with the specified value in S108. Alternatively, the difference between the received signal strength measured by the RSSI measurement unit 22a in the burst signal RSSI burst "ON" period and the received signal strength measured by the RSSI measurement unit 22a in the burst signal RSSI burst "OFF" period may be compared with the specified value.

In the embodiments, the vehicle side controller 13 that executes S100 can correspond to one example of a request signal sender and means. The vehicle side controller 13 that executes S102 can correspond to one example of a determination signal sender and means. The RSSI measurement unit 22a can correspond to one example of a received signal strength measurement unit and means. The portable device side controller 26 that executes S204 and S206 can correspond to one example of a response signal sender and means. The vehicle side controller 13 that executes S104 can correspond to one example of a reception determination unit and means. The vehicle side controller 13 that executes S108 can correspond to one example of a reception strength determination unit and means. The vehicle side controller 13 that executes S112 and S110 can correspond to one example of an on-board apparatus control unit and means. The vehicle side controller 13 that executes S109 can correspond to one example of noise level determination means. The vehicle side controller 13 that executes S114 can correspond to one example of a transmission level change command unit and means.

Although, embodiments and configurations of the present disclosure have been illustrated above, embodiments and configurations of the present disclosure are not limited to the above-illustrated embodiments and configurations. Embodiments and configurations obtained by appropriately combining technological elements disclosed in differing embodiments and configurations are also included in the scope of embodiments and configurations of the present disclosure.

What is claimed is:

1. An on-board apparatus control system, comprising:
a portable device carried by a user; and
an vehicle-mounted device that, by communication with the portable device, make a determination of whether or not the portable device exists in an authorized area, and carries out control of an on-board apparatus in accordance with a result of the determination,
the vehicle-mounted device including:
a request signal sender that causes a specific transmission antenna mounted on a vehicle to transmit a request signal to the portable device existing in the authorized area around the vehicle; and
a determination signal sender that causes another transmission antenna, which is separate from the specific transmission antenna transmitting the request signal, to transmit a determination signal to the portable device existing in an unauthorized area around the vehicle, the determination signal having a high level period where a high level continues for a fixed period and a low level period where a low level continues for a fixed period,
the portable device including:
a received signal strength measurement unit that measures a received signal strength of the determination signal in the high level period and a received signal strength of the determination signal in the low level period separately; and
a response signal sender that, when receiving the request signal, generates a response signal responding to the request signal so as to include received signal strength information representing the received signal strength of the determination signal in the high level period and received signal strength information representing the received signal strength of the determination signal in the low level period, and transmits the response signal to the vehicle-mounted device,
the vehicle-mounted device including:
a reception determination unit that determines whether or not the response signal has been received;
a received strength determination unit that determines, based on the received signal strength information which is included in the response signal and which represents the received signal strength of the determination signal in the high level period, whether or not the received signal strength of the determination signal in the high level period is greater than a specified value;
an on-board apparatus control unit that, when the reception determination unit determines that the response signal has been received and the reception strength determination unit determines that the received signal strength of the determination signal in the high level period is greater than the specified value, carries out the control of the on-board apparatus on assumption that the portable device exists in the unauthorized area;
a noise level determination unit that determines, based on the received signal strength information representing the received signal strength of the determination signal in the low level period, whether or not a noise level around the vehicle is greater than a specified value; and
a transmission level change command unit that, when the noise level determination unit determines that the noise level around the vehicle is greater than the specified value, commands the determination signal sender to transmit the determination signal to the portable device existing in the unauthorized area around the vehicle by increasing a transmission level of the determination signal.

2. The on-board apparatus control system according to claim 1, wherein
the on-board apparatus control unit carries out the control of the on-board apparatus on assumption that the portable device exists in the authorized area when: the reception determination unit determines that the response signal has been received; and the reception strength determination unit determines that the received signal strength of the determination signal in the high level period is equal to or smaller than the specified value.

3. The on-board apparatus control system according to claim 1, wherein
the determination signal sender transmits the determination signal after the elapse of a predetermined period from the request signal being transmitted by the request signal sender.

4. The on-board apparatus control system according to claim 1, wherein:
the vehicle-mounted device is communicably connected to a sensor that detects a door touch operation for unlocking a vehicle door;
when a touch operation of one door of a plurality of doors is detected by the sensor, the vehicle-mounted device,
transmits the request signal, without transmitting the determination signal, from the specific antenna positioned in vicinity of the one door, on which the touch operation has been carried out, to the authorized area, which is a predetermined region on a periphery of the one door on which the touch operation has been carried out, and
transmits the determination signal, without transmitting the request signal, from the another transmission antenna positioned in the vicinity of doors other than the one door, on which the touch operation has been carried out, to the unauthorized area, which is a predetermined region on peripheries of the plurality of doors other than the one door on which the touch operation has been carried out;

when the reception determination unit determines that the response signal has been received and the reception strength determination unit determines that the received signal strength of the determination signal is greater than the specified value, the on-board apparatus control unit carries out the control of the on-board apparatus on assumption that the portable device exists in the unauthorized area being the predetermined region on peripheries of the doors other than the one door on which the touch operation has been carried out, even when it is determined by; and when the reception determination unit determines that the response signal has been received and the reception strength determination unit determines that the received signal strength of the determination signal is equal to or smaller than the specified value, the on-board apparatus control unit carries out the control of the on-board apparatus on assumption that the portable device exists in the authorized area, which is the predetermined region on the periphery of the one door on which the touch operation has been carried out.

\* \* \* \* \*